United States Patent
Osawa et al.

(10) Patent No.: US 6,989,343 B2
(45) Date of Patent: Jan. 24, 2006

(54) GRANULAR PHOTOCATALYTIC MATERIAL, FUNCTIONAL RESTORATION METHOD THEREFOR, AND APPARATUS FOR DECOMPOSING AND REMOVING TOXIC ORGANIC MATTER USING THE SAME

(75) Inventors: Akira Osawa, Hamamatsu (JP); Yoichi Nagasaki, Hamamatsu (JP); Jun Yamamoto, Hamamatsu (JP); Kunimasa Muroi, Hamamatsu (JP)

(73) Assignee: Yamaha Corporation, (JP)

( * ) Notice: Subject to any disclaimer, the term of this patent is extended or adjusted under 35 U.S.C. 154(b) by 241 days.

(21) Appl. No.: 10/278,936

(22) Filed: Oct. 24, 2002

(65) Prior Publication Data
US 2003/0104930 A1 Jun. 5, 2003

(30) Foreign Application Priority Data
Oct. 25, 2001 (JP) .............................. 2001-328357

(51) Int. Cl.
*B01J 31/00* (2006.01)
*B01J 37/00* (2006.01)
*B01J 21/08* (2006.01)
*B01J 21/12* (2006.01)
*B01J 21/14* (2006.01)

(52) U.S. Cl. .............. 502/125; 502/232; 502/237; 502/250; 502/251; 428/328; 428/331; 428/404; 428/689

(58) Field of Classification Search ............... 502/239, 502/242, 250, 251, 232, 237, 350, 527.14, 502/527.16, 527.24, 125; 428/328, 331, 428/404, 689
See application file for complete search history.

(56) References Cited

U.S. PATENT DOCUMENTS

| | | | | |
|---|---|---|---|---|
| 5,411,803 A | * | 5/1995 | George et al. | 428/403 |
| 5,965,479 A | * | 10/1999 | Suzuki et al. | 502/182 |
| 5,981,425 A | * | 11/1999 | Taoda et al. | 502/208 |
| 6,228,480 B1 | * | 5/2001 | Kimura et al. | 428/328 |
| 6,368,668 B1 | * | 4/2002 | Kobayashi et al. | 427/376.2 |
| 6,569,520 B1 | * | 5/2003 | Jacobs | 428/330 |

FOREIGN PATENT DOCUMENTS

| | | | |
|---|---|---|---|
| EP | 0633064 A1 | * | 1/1995 |
| EP | 0675086 A2 | * | 10/1995 |
| JP | 8-164334 | | 6/1996 |
| JP | 11-188272 | | 7/1999 |
| JP | 2000-271489 | | 10/2000 |

* cited by examiner

*Primary Examiner*—Stanley Silverman
*Assistant Examiner*—Jonas N. Strickland
(74) *Attorney, Agent, or Firm*—Dickstein, Shapiro, Morin & Oshinsky, LLP.

(57) ABSTRACT

A granular photocatalytic material in the form of pellets or tablet is produced by compressing a photocatalyst mixture containing photocatalytic particles and a filler in air, a vacuum, or an inert gas at a temperature of 0 to 200° C., a pressure of 500 to 6000 kg/cm$^2$, and a pressing time of 0.01 to 60 seconds. An alkali slurry is applied on the surface of the granular photocatalytic material. A method of restoring a function of granular photocatalytic material comprises washing the surface of the granular photocatalytic material with the slurry or an alkali solution of sodium hydroxide An apparatus for decomposing and removing toxic organic matter comprises a means of bringing the granular photocatalytic material into contact with the toxic organic matter in a liquid or air, and a means of irradiating the granular photocatalytic material with light having a wavelength of 400 nm or less.

6 Claims, 4 Drawing Sheets

GRANULAR PHOTOCATALYTIC MATERIAL, FUNCTIONAL RESTORATION METHOD THEREFOR, AND APPARATUS FOR DECOMPOSING AND REMOVING TOXIC ORGANIC MATTER USING THE SAME

BACKGROUND OF THE INVENTION

1. Field of the Invention

The present invention relates to a granular photocatalytic material that decomposes organic matter using light energy, a production method therefor, a functional restoration method therefor, and an apparatus for decomposing and removing toxic organic matter. More particularly, the present invention relates to a granular photocatalytic material that is superior in durability, water resistance and chemical resistance, a functional restoration method therefor, and an apparatus for decomposing and removing toxic organic matter.

2. Description of Related Art

A photocatalytic reaction is a reaction wherein organic matter is decomposed by using a photocatalyst in the presence of light energy. This reaction has widely been studied as a technology of decomposing toxic organic matter using ultraviolet light included in light emitted from the sun, or indoor lighting such as fluorescent lamps or incandescent lamps for the purpose of purification of water or air, and for building materials such as tiles.

Titanium dioxide particles or a thin titanium dioxide film, that is formed by firing an alkoxide solution of metallic titanium, has generally been used as the photocatalyst.

When using fine titanium dioxide particles, there may be mentioned a method of using fine titanium dioxide particles as they are, a method of fixing fine titanium dioxide particles on solid matter using a binder, or a method of mixing fine titanium dioxide particles with a paint or hydrate, applying the mixture on solid matter, and drying the mixture, thereby fixing the fine titanium dioxide particles on the solid matter. When using an alkoxide solution of metallic titanium, the thin titanium dioxide film is formed by a so-called sol-gel method of applying the solution on solid matter, followed by drying and firing.

There is also a method of forming a thin titanium dioxide film on solid matter by a CVD method or a sputtering method.

When using fine titanium dioxide particles as they are, there is a merit such that high photoactivity and high decomposability of the organic matter are achieved because the fine titanium dioxide particles have a large surface area and therefore exhibit high adsorptivity of the organic matter. However, the fine titanium dioxide particles are not easily handled because the average particle diameter is from about 5 to 300 nm, and it is hard to control the position when used in air or liquid. When the fine titanium dioxide particles are scattered or dispersed, the fine titanium dioxide particles cause scattering of ultraviolet light, have poor light efficiency, and are not easily recovered.

When the fine titanium dioxide particles are used in a state of being fixed on the solid matter using a binder, a problem arises in that the decomposition efficiency of the organic matter is lowered because of a small contact area between the fine titanium dioxide particles and the organic matter, oxygen, or ultraviolet light. When using an organic binder, a problem arises in that the binder itself is decomposed by the fine titanium dioxide particles.

When a thin film of titanium dioxide is formed from an alkoxide solution of metallic titanium on the solid matter using a sol-gel method, there is a merit such that the film can be formed in a small space without exerting any influence on the form of the solid matter and an anatase crystal can be produced by firing at a temperature of 600° C. or lower. However, a long time ranging from 5 to 6 hours is necessary, to produce the thin film by firing at this temperature, and the production conditions are difficult to control. Also, since the thin film has a smaller contact area with the organic matter as compared with the fine particles of titanium dioxide, problems arise such as low decomposition efficiency, poor durability, and poor adsorptivity of the organic matter.

As described in Japanese Unexamined Patent Application, First Publication No. Hei 6-315614A, a photocatalyst can be used which is produced by using a fluororesin as a binder, kneading photocatalytic particles with the fluororesin, extruding the kneaded mixture through an extruder, and rolling it to form a sheet. In this case, the fluororesin is not decomposed by the photocatalyst. However, according to the method of forming the sheet of the photocatalyst, the binding force between the photocatalyst powder and the fluororesin is increased by forming under the conditions of a temperature of 350 to 400° C. and a pressure of 200 to 300 kg/cm$^2$, and therefore the photocatalyst powder is embedded into the fluororesin and the content of the photocatalyst powder at the surface of the resulting sheet decreases, thus reducing the active surface of the sheet. Also, the content of the fluororesin must be increased to 50% by weight or more in order to increase the strength of the sheet, thus resulting in a high manufacturing cost.

In addition to insufficient long-term water resistance, the granular photocatalytic material comprising photocatalytic particles and a filler had problems such that a chlorine-, sulfur-, or nitrogen-based intermediate product or final product formed by the decomposition of the organic matter due to the photocatalyst lowered the activity of the photocatalyst and delayed the decomposition reaction.

Also, the granular photocatalytic material comprising photocatalytic particles and colloidal silica had a problem such that the mechanical strength was insufficient and was about ½ to ⅓ of that of the above granular photocatalytic material comprising photocatalytic particles and a filler.

BRIEF SUMMARY OF THE INVENTION

The present invention has been devised to solve the problems described above, and has an object to provide a granular photocatalytic material which exhibits excellent durability, excellent water resistance, and excellent chemical resistance while maintaining a large surface area, and a high organic matter adsorptivity and photoactivity of fine photocatalyst particles, a functional restoration method therefor, and an apparatus for decomposing and removing toxic organic matter using the same.

The above object can be achieved by a process for producing a granular photocatalytic material which comprises (a) a step of preparing a photocatalyst mixture containing photocatalytic particles and a filler; and (b) a step of forming a granular photocatalitic material in air, a vacuum, or an inert gas at a temperature of 0 to 200° C., a pressure of 500 to 6000 kg/cm$^2$, and a pressing time of 0.01 to 60 seconds.

The content of the photocatalytic particles in the photocatalyst mixture is preferably 40% by weight or more.

The filler preferably includes one or more materials selected from magnesium silicate, aluminum silicate, calcium silicate, sodium hydrogen carbonate, sodium carbonate, calcium hydroxide, calcium oxide, calcium carbonate, aluminum oxide, silicon dioxide, gypsum, inorganic whiskers, inorganic fibers, inorganic colloids, polytetrafluoroethylene, perfluoroalkoxy resin, perfluoroethylenepropylene resin, and ethylene-tetrafluoroethylene copolymer resin.

The filler preferably contains an inorganic porous material in an amount of less than 20% by weight of the photocatalyst mixture.

A textured pattern is formed on the surface of the granular photocatalytic material.

A slurry containing one or more materials selected from sodium carbonate, calcium hydroxide, calcium oxide, sodium hydrogen carbonate, and silicon dioxide is preferably applied on the surface of the granular photocatalytic material.

The above object can also be achieved by a method of restoring a function of granular photocatalytic material comprising a mixture containing photocatalytic particles and a filler, which comprises washing the surface of the granular photocatalytic material with a slurry or an alkaline solution containing one or more materials selected from sodium carbonate, calcium hydroxide, calcium oxide, sodium hydrogen carbonate, silicon dioxide, and sodium hydroxide, thereby restoring a function of the granular photocatalytic material.

The above object can be achieved by a granular photocatalytic material which comprises photocatalytic particles and an organic filler and is in the form of pellets or tablets.

The content of the photocatalytic particles in the photocatalytic material is preferably 40% by weight or more.

The organic filler includes one or more materials selected from polytetrafluoroethylene, perfluoroalkoxy resin, perfluoroethylenepropylene resin, and ethylene-tetrafluoroethylene copolymer resin.

A textured pattern is preferably formed on the surface of the granular photocatalytic material.

The maximum length is preferably from 1 to 10 mm and a minimum length is preferably from 0.5 to 5 mm.

A slurry containing one or more materials selected from sodium carbonate, calcium hydroxide, calcium oxide, sodium hydrogen carbonate, and silicon dioxide is preferably applied on the surface of the granular photocatalytic material.

The above object can be achieved by an apparatus for decomposing and removing toxic organic matter, comprising a photocatalitic reaction section which is filled with a granular photocatalytic material in the form of pellets or tablets and containing photocatalitic particles and an organic filler, wherein the photocatalytic particles can contact the toxic organic matter in the form of liquid or gas, and a means of irradiating the granular photocatalytic material with light having a wavelength of 400 nm or less.

Preferably the apparatus for decomposing and removing toxic organic matter further comprises a photocatalyst washing section which supplies the photocatalytic reaction section, with a photocatalyst washing fluid comprising a slurry or alkaline solution containing one or more materials selected from sodium carbonate, calcium hydroxide, calcium oxide, sodium hydrogen carbonate, and silicon dioxide, or sodium hydroxide, thereby restoring a function of the granular photocatalytic material.

DETAILED DESCRIPTION OF THE INVENTION

Figure 1:
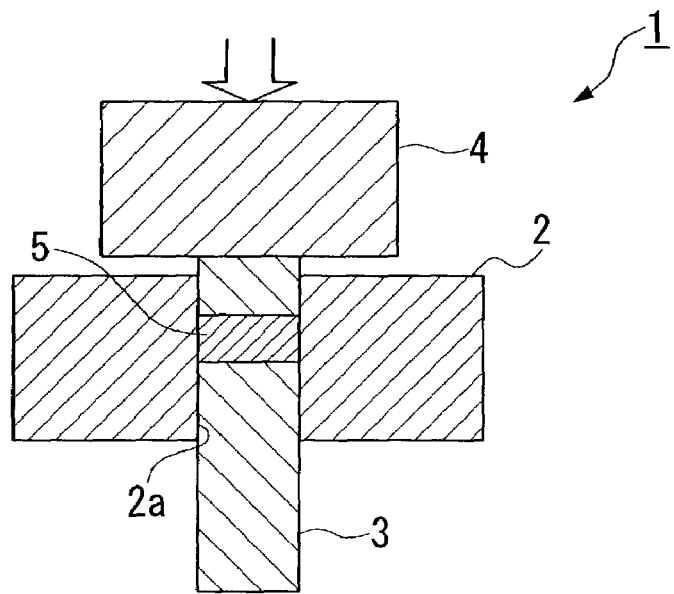
FIG. 1 is a schematic sectional view showing a method of producing a granular photocatalytic material of the present invention.

The present invention will now be described in detail.

In an embodiment, the granular photocatalytic material of the present invention is in the form of pellets or tablets, which are produced by compressing a photocatalyst mixture comprising photocatalytic particles, a filler, and an inorganic porous material.

The photocatalytic particles used in this embodiment are not specifically limited as long as they are capable of carrying out the catalytic reaction, but are usually particles made of a known photocatalyst such as titanium dioxide, zinc oxide, cadmium selenide, gallium arsenic, or strontium titanate, and preferably titanium dioxide particles. More preferably, they are photocatalytic particles which have an average particle diameter of 5 to 300 nm and a particle size distribution of 3 to 500 nm. These photocatalytic particles, which exhibit the above average particle diameter and a particle size distribution, are preferred because of their high surface area and high photoactivity.

The filler used in the present invention is preferably made of one or more materials selected from inorganic fillers such as magnesium silicate, aluminum silicate, calcium silicate, sodium hydrogen carbonate, sodium carbonate, calcium hydroxide, calcium oxide, calcium carbonate, aluminum oxide, silicon dioxide, gypsum, inorganic whiskers, inorganic fibers, and inorganic colloids; and fluorine-based resins such as polytetrafluoroethylene, perfluoroalkoxy resin, perfluoroethylenepropylene resin, and ethylene-tetrafluoroethylene copolymer resin.

A fluorine-based resin is a stable material, and the granular photocatalytic material made of a fluorine-based resin has improved moldability and releasability because of the lubricity of the surface. A fluorine-based resin is also superior in water repellency and chemical resistance. Therefore, a fluorine-based resin is a particularly preferable resin used to improve the durability and stability of the granular photocatalytic material.

The granular photocatalytic material made of a fluorine-based resin is superior in durability to a chlorine-, sulfur-, or nitrogen-based intermediate product or final product formed by the decomposition of the organic matter due to the photocatalyst. The granular photocatalytic material also has sufficient water resistance and chemical resistance to dipping in an alkali solution and repeated washing with the alkali solution.

Since the granular photocatalytic material is sometimes used to treat toxic organic matter in a high-temperature solution at a high flow rate, the granular photocatalytic material in this embodiment must be superior in durability and mechanical strength. Therefore, fillers are mixed with the photocatalyst mixture in a range in which the photocatalytic activity of the photocatalytic particles is not impaired. The content of the filler is preferably 60% by weight or less, and more preferably from 10 to 40% by weight, based on the photocatalyst mixture. When the content of the filler exceeds 60% by weight, the photoactivity of the photocatalytic particles is impaired, and the resulting catalyst having insufficient photocatalytic activity is not suited for practical use.

When using, as the filler, one or more materials selected from carbonate, calcium hydroxide, calcium oxide, sodium hydrogen carbonate, and silicon dioxide, these fillers chemically react with a chlorine-, sulfur-, or nitrogen-based intermediate product or final product formed by the decomposition of the organic matter due to the photocatalyst, thus making it possible to prevent the inhibition of the photocatalytic reaction.

The inorganic porous material used in this embodiment preferably has a function of adsorbing organic matter, and examples thereof include active carbon, zeolite, silica, a resin adsorbing agent, and a metal complex. Particularly, zeolite is preferred. The frequency of contact of the photocatalytic particles with toxic organic matter contained in a liquid or air increases by incorporating the inorganic porous material having the function of adsorbing the organic matter into the granular photocatalytic material. First, the inorganic, porous material adsorbs the toxic organic matter contained in the liquid or air, and then photocatalytic particles, which exist in the vicinity of the inorganic porous material, decompose the organic matter, and thus the decomposition reaction is carried out very efficiently.

The inorganic porous material is mixed with the photocatalyst mixture in a range in which the photocatalytic activity of the photocatalytic particles is not impaired. The content of the inorganic porous material is preferably less than 20% by weight or less, and more preferably from 5% by weight or more and less than 20% by weight, based on the photocatalyst mixture. When the content of the weight or more, the photoactivity of the photocatalytic particles is impaired, and the resulting catalyst having insufficient photocatalytic activity is not suited for practical use. This is not preferred also because the amount of the organic matter adsorbed increases and exceeds the processing ability of the photocatalyst.

The granular photocatalytic material of the present invention is a granular photocatalytic material in the form of pellets or tablets, which is produced by compressing a photocatalyst mixture comprising photocatalytic particles, a filler, and an inorganic porous material in air, a vacuum, or an inert gas at a temperature of 0 to 200° C., a pressure of 500 to 6000 kg/cm$^2$, and a pressing time of 0.01 to 60 seconds. More preferred molding conditions are as follows: a temperature of 10 to 30° C., a pressure of 1000 to 2000 kg/cm$^2$, and a pressing time of 0.01 to 60 seconds.

The content of the photocatalytic particles in the photocatalyst mixture is preferably 40% by weight or more, and more preferably from 60 to 90% by weight. When the content of the photocatalytic particles is less than 40% by weight, the photoactivity of the photocatalytic particles may be impaired, and the resulting catalyst having insufficient photocatalytic activity may not be suited for practical use.

The granular photocatalytic material of the present invention is easily handled and is not scattered or dispersed since it has the form of pellets or tablets, thus making it possible to control the position of the granular photocatalytic material. Therefore, it becomes possible to easily recover the granular photocatalytic material and to locate the granular photocatalytic material at a position where high irradiation efficiency of ultraviolet light is achieved.

The size of the granular photocatalytic material is not specifically limited as long as it is a size suited for the purpose, but the maximum length is preferably from 1 to 10 mm, and the minimum length is preferably from 0.5 to 5 mm. The size of the granular photocatalytic material is preferably within the above range because of easy manufacturing and excellent productivity.

Also, a textured pattern is preferably formed on the surface of the granular photocatalytic material of the present invention. Formation of the textured pattern on the surface of the granular photocatalytic material enlarges the surface area of the granular photocatalytic material, and improves the frequency of contact of the photocatalytic particles with the organic matter and the organic matter adsorption efficiency of the inorganic porous material. As a result, the decomposability of the organic matter of the granular photocatalytic material is improved.

The method of forming a textured pattern on the surface of the granular photocatalytic material includes, for example, a method of previously forming a pattern such as an embossment or relief at the section where the surface of the granular photocatalytic material of the inner surface of the mold is formed in the compression molding of the granular photocatalytic material and forming a textured pattern during compression molding, or a method of forming a textured pattern on the surface of the granular photocatalytic material by machining or sand blasting after compression molding of the granular photocatalytic material.

The granular photocatalytic material of the present invention is dried after coating the surface with an alkali slurry containing at least one kind selected from sodium carbonate, calcium hydroxide, calcium oxide, sodium hydrogen carbonate, and silicon dioxide. Such a treatment makes it possible to maintain the photoactivity of the photocatalyst.

Figure 2:
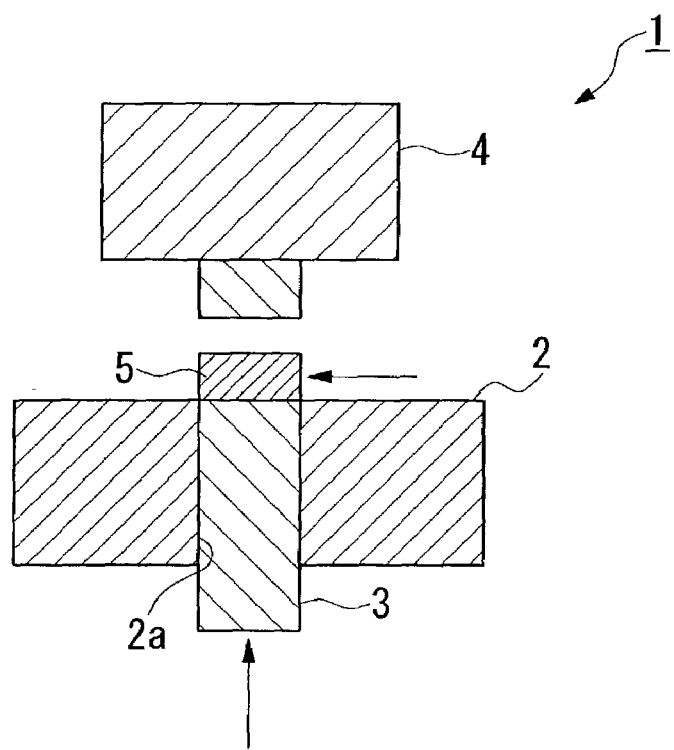
FIG. 2 is a schematic sectional view showing a method of producing a granular photocatalytic material of the present invention.

FIG. 1 and FIG. 2 are schematic sectional views showing a method of producing an embodiment of a granular photocatalytic material of the present invention, in which FIG. 1 shows the state where the granular photocatalytic material is compressed and FIG. 2 shows the state where the granular photocatalytic material is removed.

The method of producing granular photocatalytic material as an embodiment of the present invention will now be described with reference to FIG. 1 and FIG. 2.

First, photocatalytic particles, a filler, and an inorganic porous material are sufficiently kneaded to obtain a mixture. Then, the resulting mixture is granulated by a granulator. A lower punch 3 is inserted into a through hole 2a having a circular horizontal cross section provided by passing through a mortar 2 in the vertical direction at the center of the mortar 2 of a tablet machine 1, and then the lower punch 3 is fixed at a predetermined position. A proper amount of the mixture is charged from the upper section of the mortar 2. An upper punch 4 is inserted into the through hole 2a, and the mixture is compressed downwardly perpendicular to the mortar 2. If necessary, the mortar 2 is heated by a heater, and granular photocatalytic material 5 is formed by compressing under the conditions of a temperature of 0 to 200° C., a pressure of 500 to 6000 kg/cm$^2$, and a pressing time of 0.01 to 60 seconds. After a predetermined time has elapsed, the granular photocatalytic material 5 is removed from the through hole 2a by upwardly pulling the upper punch 4 and simultaneously upwardly pushing the lower punch 3 so that the tip section of the upper punch and the top surface of the mortar 2 are in the same plane, and then the granular photocatalytic material 5 is pushed out in the horizontal direction.

The granular photocatalytic material 5 is formed by compressing it in air, a vacuum, or an inert gas. To obtain granular photocatalytic material 5 having high photocatalytic activity, the photocatalyst is not contaminated with impurities during compression and is preferably compressed in a vacuum or an inert gas.

The method of forming a textured pattern on the surface of the granular photocatalytic material 5 includes, for example, a method of previously forming a pattern such as an embossment or relief at the surface of at least one of the upper or lower punch which forms the surface of the granular photocatalytic material in the compression molding of the granular photocatalytic material 5, or a method of forming a textured pattern on the surface of the granular photocatalytic material 5 by machining or sand blasting after compression molding of the granular photocatalytic material 5.

Then, a slurry containing one or more materials selected from sodium carbonate, calcium hydroxide, calcium oxide, sodium hydrogen carbonate, and silicon dioxide is applied on the surface of the granular photocatalytic material 5 and dried to obtain the granular photocatalytic material of the present invention.

Since the granular photocatalytic material of the present invention can be produced by kneading photocatalytic particles with a filler and compressing the mixture, a large-sized machine is not required, unlike extrusion molding or injection molding, resulting in a low manufacturing cost. The producition method of the granular photocatalytic material of the present invention is suited for continuous molding because of the low molding temperature of 0 to 20° C. and the short pressing time of 0.01 to 60 seconds.

When using a fluorine-based resin as a filler in the granular photocatalytic material thus obtained, it becomes easy to remove the granular photocatalytic material from the mold after compression molding because of the lubricity of the surface. The resulting granular photocatalytic material is easily handled and easily recovered after use since it has the form of pellets or tablets, thus making it possible to use it for purposes other than conventional purposes.

The method of restoring the function of the granular photocatalytic material of the present invention comprises washing the surface of the granular photocatalytic material used to decompose a given amount of toxic organic matter for a given period with the above slurry or an alkali solution such as sodium hydroxide solution, thereby restoring the function of the granular photocatalytic material (photoactivity).

Although the photo-oxidative reaction (decomposition reaction) of the organic matter by the photocatalyst is basically caused by a photo-excited radical, the kinds of the radical are largely influenced by the molecular structure of the organic matter itself which is to be decomposed.

For example, for the case when a chlorine-based organic solvent is decomposed, a chlorine radical produced by the decomposition may either promote or inhibit the decomposition. In other words, the decomposition does not proceed only by irradiating the photocatalyst with ultraviolet light.

When the chlorine-based organic solvent is decomposed, a chlorine-based gas such as chlorine, hydrogen chloride, phosgene, or carbon tetrachloride is produced. Since the chlorine-based gas is toxic to the human body, it is necessary to make the chlorine-based gas non-toxic by neutralization. When the human body is exposed to an atmosphere including a chlorine-based gas, a large load of a high concentration of the chlorine-based gas is imposed on the human body and is very dangerous. Therefore, the discharge amount of the chlorine-based gas is preferably reduced to be as small as possible.

For example, when methylene chloride is decomposed and the concentration of chlorine produced by the decomposition increases, chloroform or carbon tetrachloride is produced and the decomposition rate drastically decreases. When perchloroethylene is decomposed, chlorine radicals produced by the decomposition tend to further promote the decomposition. However, the concentration of the chlorine radicals must be increased to promote the decomposition.

To actually decompose the organic matter by using the photocatalyst, the reaction conditions must be controlled according to the form of the decomposition reaction.

Thus, the granular photocatalytic material of the present invention has made possible to control the reaction conditions according to the form of the decomposition reaction by applying the above alkali slurry on the surface of the granular photocatalytic material of the present invention. The method of restoring the function of the granular photocatalytic material of the present invention has made possible to control the reaction conditions according to the form of the decomposition reaction by washing the surface of the granular photocatalytic material with the above alkali slurry, or an alkali solution such as sodium hydroxide solution.

The method of restoring the function of the granular photocatalytic material of the present invention is preferably carried out while the material is accommodated in an apparatus for decomposing and removing toxic organic matter described hereinafter.

Figure 3:
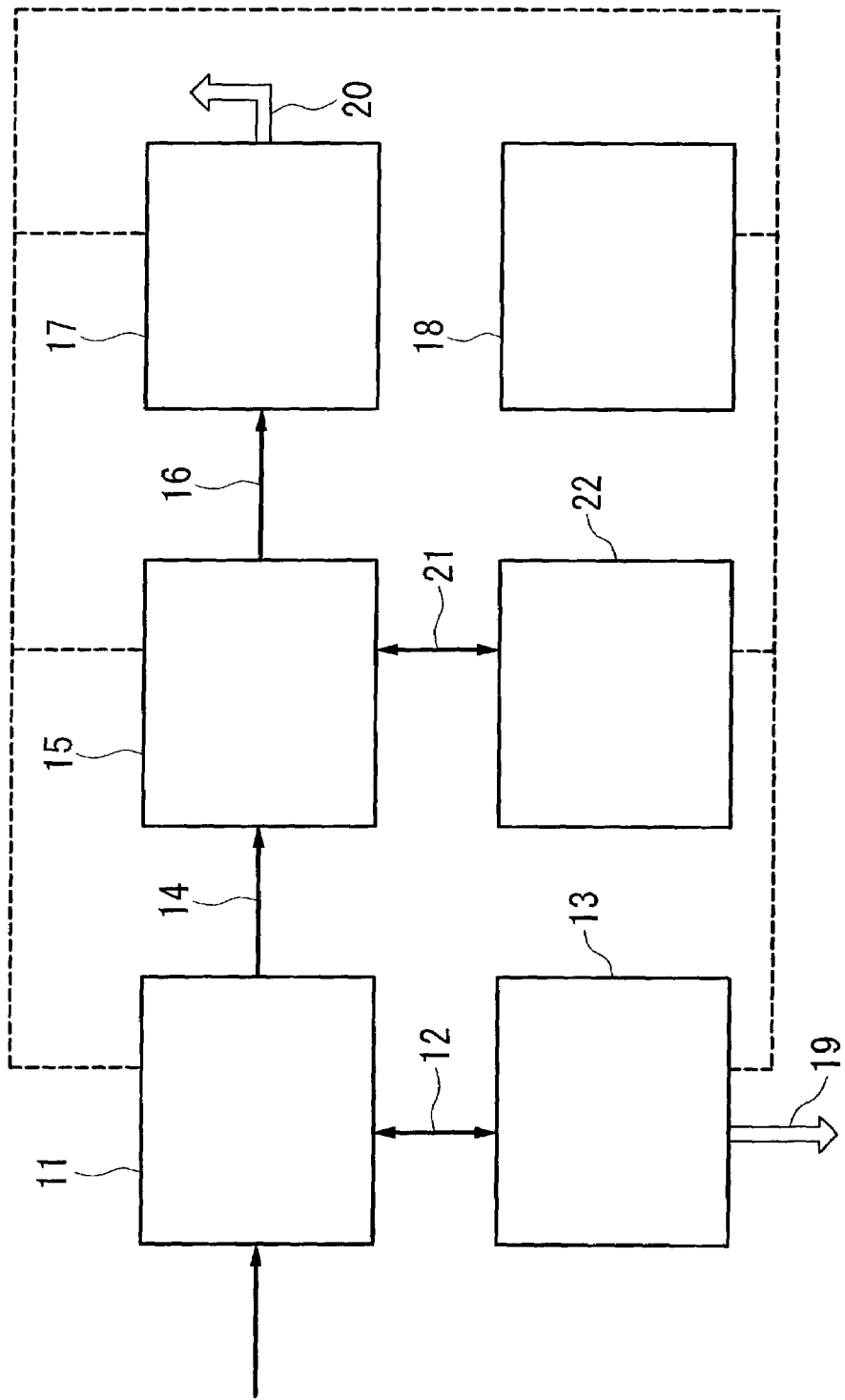
FIG. 3 is a flow chart schematically showing an example of an apparatus for decomposing and removing toxic organic matter of the present invention.

FIG. 3 is a flow chart schematically showing an example of an apparatus for decomposing and removing toxic organic matter of the present invention.

In FIG. 3, reference numeral 11 denotes a solvent separation process section, and the arrows indicate the direction in which the chlorine-based organic solvent flows. The solvent separation process section 11 is connected to a vaporization process section 13 either directly or via a waste liquid supply line 12. Further connected to the vaporization process section 13 is a discharge line 19 that discharges effluent after aeration.

The solvent separation process section 11 is also connected, via a vaporization gas supply line 14, to a photo-oxidative decomposition process section 15, and the photo-oxidative decomposition process section 15 is connected to a post-process section 17 via a decomposition product gas supply line 16. Further connected to the post-process section 17 is a discharge line 20 that discharges non-toxic air containing post-treated water and carbon dioxide.

The photo-oxidative decomposition process section 15 is filled with the granular photocatalytic material described above. The photo-oxidative decomposition process section 15 is connected to a granular photocatalytic material cleaning section 22 via a circulating pipeline 21.

The apparatus for decomposing and removing toxic organic matter of the present invention further comprises a control section 18 that controls the solvent separation process section 11, the vaporization process section 13, the photo-oxidative decomposition process section 15, the post-treatment process section 17, and the granular photocatalytic material cleaning section 22.

The solvent separation process section 11 selectively adsorbs a chlorine-based organic solvent that is dispersed in the form of minute particles in the waste liquid. Then the waste liquid containing the chlorine-based organic solvent that has not been adsorbed in the solvent separation process section 11 is aerated in the vaporization process section 13 so as to vaporize the chlorine-based organic solvent, and the vaporization gas including a chlorine-based organic gas thus generated is passed through the solvent separation process section 11 again. When passing through the solvent separation process section 11, the vaporization gas vaporizes the chlorine-based organic solvent that has been adsorbed in the solvent separation process section 11, and the total combined vaporization gas is introduced into the photo-oxidative decomposition process section 15 through the vaporization gas supply line 14. Then the vaporization gas is brought into contact with the granular photocatalytic material in the photo-oxidative decomposition process section 15, and the granular photocatalytic material is irradiated with light having a wavelength of 400 nm or less, namely, ultraviolet light, thereby performing photooxidative decomposition of the vaporization gas. Then, the decomposition product gas containing chlorine-based gas generated by the photo-oxidative decomposition reaction is introduced into the post-process section 17 through the decomposition product gas supply line 16, so as to be adsorbed, absorbed, and/or neutralized in the post-process section 17 to become non-toxic chlorides, thereby completing the treatment of waste liquid or exhaust gas.

After a predetermined number of photo-oxidative decomposition treatments or a predetermined time in the photo-oxidative decomposition process section 15 has elapsed, the granular photocatalytic material in the photo-oxidative decomposition process section 15 is washed, thereby restoring its function (photoactivity). The functional restoration method comprises introducing a slurry containing one or more materials selected from sodium carbonate, calcium hydroxide, calcium oxide, sodium hydrogen carbonate, and silicon dioxide, or an alkali solution such as sodium hydroxide solution in the granular photocatalytic material cleaning section 22 into the photo-oxidative decomposition process section 15 via the circulating pipeline 21, and circulating it in the photo-oxidative decomposition process section 15. Washing of the granular photocatalytic material is controlled by the control section 18 so that washing is automatically carried out after a predetermined number of photo-oxidative decomposition treatments or a predetermined time has elapsed.

The slurry or alkali solution is controlled by the control section 18 so that the pH is monitored by a pH sensor or the slurry or alkali solution is automatically replaced after a predetermined number of washing treatments has elapsed. The pH of the slurry or alkali solution is maintained at a value of 8 or more.

Figure 4:
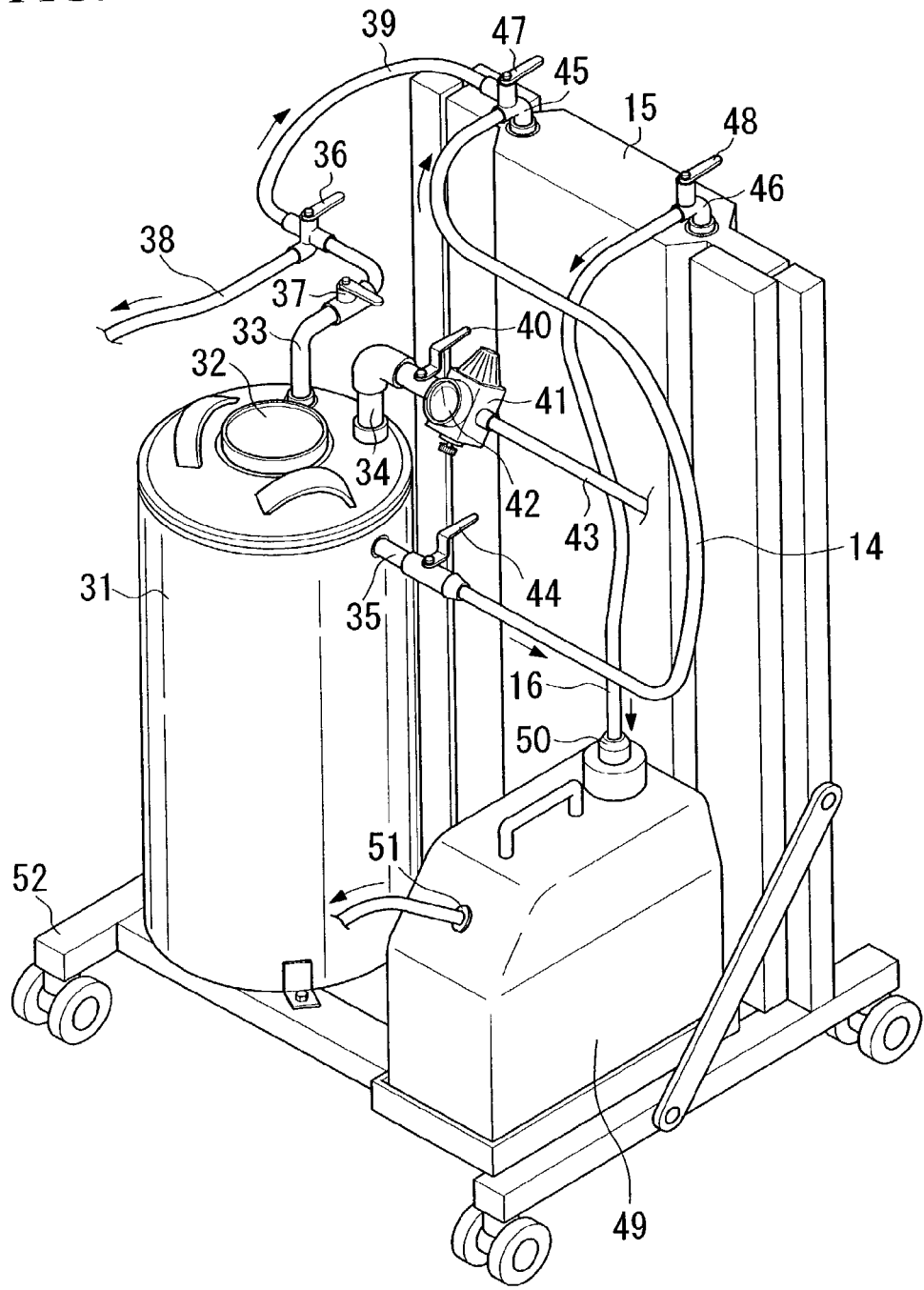
FIG. 4 is a schematic perspective view showing an example of an apparatus for decomposing and removing toxic organic matter of the present invention.
Figure 5:
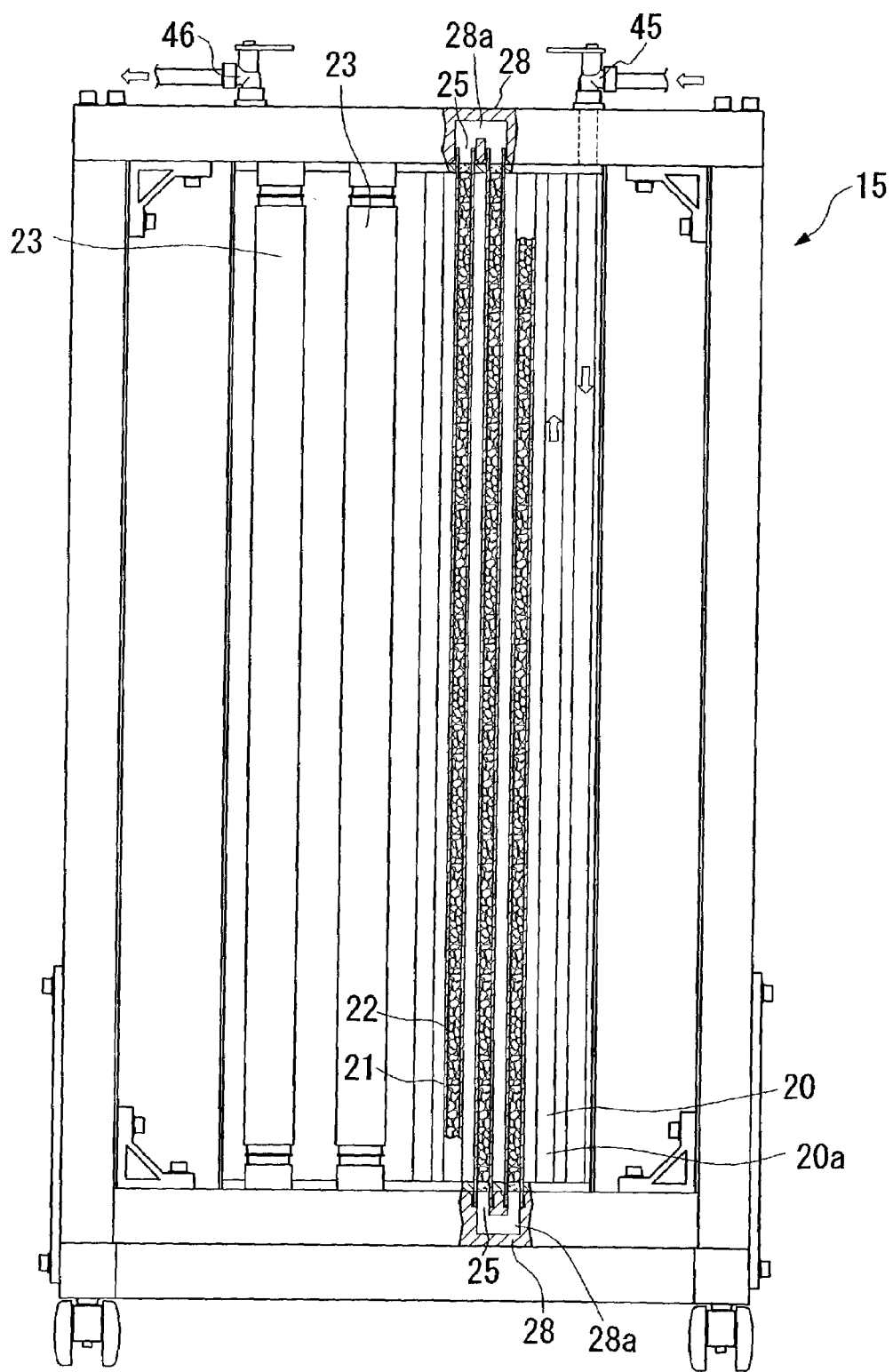
FIG. 5 is a back view of the decomposition and removing apparatus comprising a persipective view of a part of the photo-oxidative cecomposition process section 15 and a cross sectional view of a part of the perspective view.

FIG. 4 is a schematic perspective view showing another example of an apparatus for decomposing and removing toxic organic matter of the present invention, and FIG. 5 is a back view of the decomposition and removing apparatus comprising a persipective view of a part of the photo-oxidative cecomposition process section 15 and a cross sectional view of a part of the perspective view.

An aeration process section is used in the first vaporization process section 13. As shown in FIG. 4, the aeration process section comprises a waste liquid inlet 32 for charging waste liquid into an aeration tank 31, an effulent outlet 33 for discharging effluent after the aeration treatment, a compressed air inlet 34 for sending compressed air, and a vaporization gas outlet 35 for discharging a gas after aeration.

The aeration tank 31 is a pressure tank of substantially cylindrical shape made of a material such as a fluorocarbon resin, vinyl chloride resin, polyethylene resin, or another polymeric substance that has high corrosion resistance, high chemical resistance, and high water repellency, or a tank lined with such a material as described above on the inner surface.

Provided in the aeration tank 31 is a stirrer of jet flow type, propeller type, or the like, (not shown in the drawing) for improving the effect of aeration.

The effluent outlet 33 is provided with a first branch valve 36, a first on-off valve 37, an effluent tube 38, and a cleaning liquid supply line 39, and has the following constitution. That is, when effluent is discharged after aeration, the first branch valve 36 may be connected to the effluent tube 38 and, when a solution for washing the photocatalyst is supplied to the catalytic reaction section described hereinafter, the first branch valve 36 may be connected to the cleaning liquid supply line 39, and the first on-off valve 37 may be opened.

The compressed air inlet 34 is provided with a second on-off valve 40, a regulator 41, a pressure gage 42, and a compressed air supply line 43, thus making it possible to control the pressure in the aeration tank 31 by adjusting them.

The supply source for compressed air used in the aeration treatment may be that which is generally provided in a factory for a cleaning or washing service. The compressed air supply line 43 is detachably connected to the supply source.

The compressed air inlet 34 is provided with an aeration pipe to improve the aeration efficiency in the aeration tank 31.

The vaporization gas outlet 35 is provided with a third on-off valve 44, thus making it possible to discharge the gas after the aeration treatment to the vaporization gas supply line 14 by closing or opening the valve.

The vaporization gas supply line 14 is made of a polymeric substance which is superior in corrosion resistance, such as fluorine-based resin, polyethylene resin, or nylon resin, and is connected to the photo-oxidative decomposition process section 15.

As shown in FIG. 5, the photo-oxidative decomposition process section 15 comprises a photocatalytic reaction section 22 comprising a gas circulation line 20 in which the evaporation gas supplied from the third vaporization gas supply line 14 flows, and which is filled with a granular photocatalytic material 21 that decomposes organic substances included in the gas by photo-oxidative decomposition, and an artificial light irradiation section that comprises an ultraviolet light source 23 for irradiating the granular photocatalytic material with ultraviolet light are installed in a gas supply line (not shown), wherein the artificial light irradiation section is disposed opposite the photocatalytic reaction section.

The granular photocatalytic material preferably comprises hotocatalytic particles and an organic filler, and is in the form of pellets or tablets.

Although the apparatus shown in FIG. 4 is so constituted that the first branch valve 36 is connected to the cleaning liquid supply line 39 and the first on-off valve 37 is opened, thereby the photocatalyst can be supplied to the catalytic reaction section, the granular photocatalytic material cleaning section (not shown) may be connected via a circulating pipeline (not shown) to the photo-oxidative decomposition process section 15.

As shown in FIG. 5, the gas circulation line 20 comprises an inlet 45 and an outlet 46 and runs vertically, while about 2 to 20 straight tubes 20a are arranged parallel to each other at intervals of 8 to 35 mm in the vertical plane with adjacent straight tubes 20a being connected by a joint member 25, so as to form a flow path 28a, the straight tubes being fixed to each other by a joint member body section 28, that also serves as the structure of the entire photo-oxidative decomposition process section 15.

As shown in FIG. 4, the inlet 45 is provided with a second branch valve 47 and has the following constitution. That is, when the vaporizated gas is blown into the catalytic reaction section, the inlet 45 may be connected to the vaporization gas supply line 14 by operating the second branch valve 47 and, when a solution for washing the photocatalyst is supplied to the catalytic reaction section, the second branch valve 47 may be connected to the cleaning liquid supply line 39.

Also, the outlet 46 is provided with a fourth on-off valve 48, and the gas after the photo-oxidative decomposition treatment can be discharged to the decomposition product gas supply line 16 by operating the fourth on-off valve, thereby connecting the outlet 46 to the decomposition product gas supply line 16.

As shown in FIG. 5, the straight tube path 20a is made of a material that allows artificial light such as ultraviolet light and natural light to be transmitted therethrough, and a transparent material, such as borosilicate glass or synthetic resin, can be used.

The inner diameter of the straight tubes 20a is from 5 to 30 mm, and preferably from 8 to 16 mm. When the inner diameter is less than 5 mm, a smaller quantity of the granular photocatalytic material 21 can fill the gas flow path 20, resulting in a lower efficiency of photo-oxidative decomposition, while a smaller inner diameter results in a lower flow rate of gas that leads to a smaller processing capacity. When the inner diameter is larger than 30 mm, it becomes difficult for light emitted by the ultraviolet light source 23 to reach the innermost portion of the straight tubes 20a, resulting in a lower exposure rate of the granular photocatalytic material 21 to light and a lower efficiency of the photo-oxidative decomposition.

The length of the straight tube 20a is preferably made equal to the length of the ultraviolet light source 23, in a range from 200 to 800 mm. This enables it to irradiate the granular photocatalytic material 21 uniformly over the entire length of the photocatalytic reaction section 22 with ultraviolet light emitted from the ultraviolet light source 23, thereby increasing the efficiency of the photo-oxidative decomposition.

As shown in FIG. 4, the decomposition product gas supply line 16 is connected to the post-process section 17.

The post-process section 17 comprises a processing tank 49 provided with a decomposition product gas inlet 50, an exhaust gas, and an effluent outlet 51.

The decomposition product gas supply line 16, the processing tank 49, and the decomposition product gas inlet 50 are preferably made of a polymeric substance which is superior in corrosion resistance and chemical resistance, such as a fluorine-based resin, polyester resin, or nylon resin.

The processing tank 49 is a generally rectangular tank made of a material such as a fluorocarbon resin, polyethylene resin, or the like that has high corrosion resistance, or a tank lined with such a material on the inner surface.

The processing tank 49 is filled with a processing agent for adsorbing, absorbing, and neutralizing the decomposition product gas supplied from the decomposition product gas inlet 50.

The processing agent may be, for example, alkali ionic water containing one or more substances selected from calcium sulfite, calcium silicate, sodium carbonate, sodium bicarbonate, sodium thiosulfate, calcium carbonate, lime, ammonia, sodium hydroxide, alkali ionic water, and water.

The form of the processing agent is not limited to the liquid phase, and may be a powdery fluidized bed or a compound form thereof.

In order to improve the efficiency of post-treatment, an aeration pipe (not shown) is preferably provided in the processing tank 49 of the decomposition product gas inlet 50.

The vaporization process section 13, the photo-oxidative decomposition process section 15, and the post-process section 17, as constituent elements of an apparatus for processing a waste liquid, are detachably provided so that only a worn-out constituent element need be replaced by a new one if any one of the constituent elements is worn-out, and are provided and accommodated in a base section 52 equipped with four casters on the bottom.

The apparatus for decomposing and removing toxic organic matter of the present invention is superior in decomposability because of the use of the above granular photocatalytic material, and is also superior in view of the cost because a decrease in the frequency of replacement of the granular photocatalytic material due to excellent chemical resistance and excellent water resistance enables long-term use.

The effect of the present invention will be made clear by way of the following Examples.

EXAMPLE 1

Five parts of a fine titanium dioxide photocatalytic powder having an average particle diameter of about 5 to 300 nm and a particle size distribution of about 3 to 500 nm were kneaded with 2 parts of a polytetrafluoroethylene powder having an average particle diameter of 8 $\mu$m to obtain a mixture. Then, the resulting mixture was granulated by a granulator. The granulated photocatalyst mixture was compressed by a tablet machine under the conditions of a temperature of 30° C., a pressure of 1000 kg/cm$^2$, and a pressing time of 0.1 seconds to obtain a granular photocatalytic material.

EXAMPLE 2

A 5 wt % solution of sodium hydrogen carbonate was applied on the surface of the granular photocatalytic material produced in Example 1 and then dried to obtain a granular photocatalytic material.

COMPARATIVE EXAMPLE 1

Five parts of a fine titanium dioxide photocatalytic powder having an average particle diameter of about 5 to 300 nm and a particle size distribution of about 3 to 500 nm were kneaded with 2 parts of a talc powder having an average particle diameter of 8 $\mu$m to obtain a mixture. Then, the resulting mixture was granulated by a granulator. The granulated photocatalyst mixture was compressed by a tablet machine under the conditions of a temperature of 30° C., a pressure of 1000 kg/cm$^2$, and a pressing time of 0.1 seconds to obtain a granular photocatalytic material.

COMPARATIVE EXAMPLE 2

A commercially available photocatalyst thin film produced by a sol-gel method was used.

COMPARATIVE EXAMPLE 3

A fine titanium dioxide photocatalytic powder having an average particle diameter of about 5 to 300 nm and a particle size distribution of about 3 to 500 nm was used as it is.

With respect to the granular photocatalytic material obtained in Examples 1 and 2 and Comparative Examples 1 to 3, the following items were evaluated.

(1) Decomposition of Organic Matter (Decomposition of Perchloroethylene)

Perchloroethylene was decomposed under the following conditions.

The respective granular photocatalytic material was spread over the entire surface of a glass petri dish having a diameter of 12 cm$^2$ in a glass desiccator having an inner volume of 10 L, and the glass desiccator was sealed (irradiation area is fixed). After charging 50 µl of perchloroethylene using a syringe and irradiating with light from a 400-W black light, an inner gas was collected every 15 minutes, the concentrations of perchloroethylene and a carbon dioxide gas were measured, and the time required to decompose 90% of perchloroethylene was measured. The perchloroethylene poured into the glass desiccator is naturally vaporized, and thereby converted into a gas, which is brought into contact with the granular photocatalytic material due to motion of the gas.

(Decomposition of Dichloromethane)

In the same manner as in the case of the decomposition of perchloroethylene, except that 50 µl of dichloromethane was used, dichloromethane was decomposed.

(Decomposition of Toluene)

In the same manner as in the case of the decomposition of perchloroethylene, except that 20 µl of toluene was used, toluene was decomposed.

(2) Evaluation of Chemical Resistance of Granular Photocatalytic Material

During the decomposition of the organic matter of the above item (1), the state of the respective granular photocatalytic material immersed in each solvent was visually evaluated and was taken as the evaluation of the short-term chemical resistance. The respective granular photocatalytic materials were immersed in each solvent for 5 days and the state of the respective granular photocatalytic materials was observed and taken as the evaluation of the long-term chemical resistance. The evaluation criteria are as follows.

⊚: original form is maintained, reduction in strength is 5% or less (strength is hardly reduced)

○: original form is maintained, reduction in strength is from 10 to 20%

Δ: partial damage due to deliquescence phenomenon

X: damage to the entirety of the material due to deliquescence phenomenon

The evaluation results of items (1) and (2) are shown in Table 1.

TABLE 1

|  | Decomposition time of organic matter (min) | | | Chemical resistance of photocatalytic material (short-term evaluation) | Chemical resistance of photocatalytic material (long-term evaluation) |
| --- | --- | --- | --- | --- | --- |
|  | Perchloroethylene | Dichloromethane | Toluene |  |  |
| Example 1 | 30 | 120 | 180 | ⊚ | ○ |
| Example 2 | 45 | 90 | 210 | ⊚ | ○ |
| Comparative Example 1 | 30 | 120 | 180 | ○ | X |
| Comparative Example 2 | 45 | >300 | >300 | ○ | Δ |
| Comparative Example 3 | 30 | 100 | 120 | — | — |

It was confirmed, as seen in the results of Table 1, that the granular photocatalytic materials of Examples 1 and 2 are superior in decomposability and chemical resistance of organic matter. In Example 2, it was confirmed that the decomposability of dichloromethane is improved by applying a sodium hydrogen carbonate solution.

In Comparative Example 1, it was confirmed that granular photocatalytic material is broken down by deliquescence after long-term use. The commercially available photocatalyst thin film produced by a sol-gel method used in Comparative Example 2 required a long time of more than 300 minutes to decompose dichloromethane and toluen, and the photoactivity disappeared after the decomposition reaction in the decomposition of toluene. It was difficult to recover the fine titanium dioxide photocatalytic powders used in Comparative Example 3 after use, and the position was difficult to control.

(3) Evaluation of Effect of Inhibiting Evolution of Toxic Chlorine-based Gas

The granular photocatalytic material (A) produced in Example 1 and the granular photocatalytic material (B), which was obtained by applying a 5 wt % solution of sodium hydrogen carbonate on the surface of the granular photocatalytic material or washing the surface of the granular photocatalytic material with the 5 wt % solution of sodium hydrogen carbonate, were prepared.

Using these granular photocatalytic materials (A) and (B), perchloroethylene gas having a concentration of 10000 ppm or more was decomposed, and the effect of inhibiting the evolution of a toxic chlorine-based gas of these granular photocatalytic materials was evaluated. This evaluation was carried out by measuring the concentration of the toxic chlorine-based gas evolved. The results are shown in Table 2.

Using the granular photocatalytic materials (A) and (B), methylene chloride was decomposed, and the repressing effect of the effect of inhibiting the photoactivity of these granular photocatalytic materials due to a chlorine-based gas evolved during the decomposition was evaluated. This evaluation was carried out in the following manner. That is, methylene chloride was repeatedly decomposed and the decomposition ratio at the first decomposition and the decomposition ratio at the fifth decomposition were measured, and then the reduction ratio of the decomposability was determined. The results are shown in Table 3.

TABLE 2

| | Concentration of chlorine-based gas evolved (ppm) | | | |
|---|---|---|---|---|
| | Chlorine | Hydrogen chloride | Phosgene | Carbon tetrachloride |
| Granular photocatalytic material (A) | 200–300 | 100–120 | 30–50 | 20–30 |
| Granular photocatalytic material (B) | 20–30 | 5–10 | 0.5–5 | 0 |

TABLE 3

| | Reduction ratio of decomposability due to repeated decomposition = decomposition ratio at fifth decomposition/decomposition ratio at first decomposition |
|---|---|
| Granular photocatalytic material (A) | 0.2 |
| Granular photocatalytic material (B) | 0.8 |

It was confirmed, as seen in the results of Table 2, that the granular photocatalytic material (B), which is obtained by applying a 5 wt % solution of sodium hydrogen carbonate on the surface of the granular photocatalytic material or washing the surface of the granular photocatalytic material with the 5 wt % solution of sodium hydrogen carbonate, is superior in the effect of inhibiting the evolution of a toxic chlorine-based gas.

It was also confirmed, as seen in the results of Table 3, that the reduction ratio of the decomposability is small even if the granular photocatalytic material (B) is repeatedly used to decompose toxic organic matter.

As explained above, the granular photocatalytic material of the present invention is a granular photocatalytic material in the form of pellets or tablets, which is produced by compressing a photocatalyst mixture containing photocatalytic particles and a filler in air, a vacuum, or an inert gas at a temperature of 0 to 200° C., a pressure of 500 to 6000 kg/cm$^2$, and a pressing time of 0.01 to 60 seconds. Therefore, the granular photocatalytic material of the present invention is easily handled, thus making it possible to control the position of the granular photocatalytic material. Therefore, it becomes possible to easily recover the granular photocatalytic material and to locate the granular photocatalytic material at a position where high irradiation efficiency of ultraviolet light is achieved.

When the content of the photocatalytic particles in the photocatalyst mixture is 40% by weight or more, it becomes possible to obtain a granular photocatalytic material having high photocatalytic activity.

When the filler includes one or more materials selected from magnesium silicate, aluminum silicate, calcium silicate, sodium hydrogen carbonate, sodium carbonate, calcium hydroxide, calcium oxide, calcium carbonate, aluminum oxide, silicon dioxide, gypsum, inorganic whiskers, inorganic fibers, inorganic colloids, polytetrafluoroethylene, perfluoroalkoxy resin, perfluoroethylenepropylene resin, and ethylene-tetrafluoroethylene copolymer resin, and when a fluorine-based resin is particularly used, the moldability and the releasability of the granular photocatalytic material are improved by the lubricity of the surface. Also, the granular photocatalytic material is superior in durability to a chlorine-, sulfur-, or nitrogen-based intermediate product or final product formed by the decomposition of the organic matter due to the photocatalyst.

When the filler contains an inorganic porous material in an amount of less than 20% by weight based on the photocatalyst mixture, it becomes possible to efficiently adsorb organic matter without lowering the photocatalytic activity and to increase the frequency of contact between the photocatalytic particles and the organic matter.

When a textured pattern is formed on the surface of the granular photocatalytic material, it becomes possible to enlarge the surface area of the granular photocatalytic material and to improve the frequency of contact of the photocatalytic particles with organic matter and the organic matter adsorption efficiency of the inorganic porous material. As a result, the decomposability of the organic matter of the granular photocatalytic material is improved.

The granular photocatalytic material is easily produced and is also superior in productivity when the maximum length is from 1 to 10 mm and the minimum length is from 0.5 to 5 mm.

When a slurry containing one or more materials selected from sodium carbonate, calcium hydroxide, calcium oxide, sodium hydrogen carbonate, and silicon dioxide is applied on the surface of the granular photocatalytic material, it becomes possible to remove an intermediate product or final product produced on the surface of the granular photocatalytic material as a result of the decomposition of the organic matter.

According to the method of restoring the function of the granular photocatalytic material of the present invention, it becomes possible to remove an intermediate product or final product produced on the surface of the granular photocatalytic material as a result of the decomposition of the organic matter and to restore the function of the granular photocatalytic material by washing the surface of the granular photocatalytic material with a slurry containing one or more materials selected from sodium carbonate, calcium hydroxide, calcium oxide, sodium hydrogen carbonate, and silicon dioxide, or an alkali solution of sodium hydroxide. Thus, the photoactivity of the photocatalyst can be maintained.

According to the apparatus for decomposing toxic organic matter of the present invention, it becomes possible to use granular photocatalytic material for a long period because of excellent decomposability of the toxic organic matter, excellent chemical resistance, and excellent water resistance.

What is claimed is:

1. A process for producing a granular photocatalytic material, comprising:
    (a) a step of preparing a photocatalyst mixture containing photocatalytic particles and a filler; and
    (b) a step of forming a granular photocaralitic material in air, a vacuum, or an inert gas at a temperature of 0 to 200° C., a pressure of 500 to 6000 kg/cm$^2$, and a pressing time of 0.01 to 60 seconds.

2. The process for producing a granular photocatalytic material according to claim 1, wherein the content of the photocatalytic particles in the photocatalyst mixture is 40% by weight or more.

3. The process for producing a granular photocatalytic material according to claim 1, wherein the filler includes one or more materials selected from magnesium silicate, aluminum silicate, calcium silicate, sodium hydrogen carbonate, sodium carbonate, calcium hydroxide, calcium oxide, calcium carbonate, aluminum oxide, silicon dioxide, gypsum, inorganic whiskers, inorganic fibers, inorganic colloids, polytetrafluoroethylene, perfluoroalkoxy resin, perfluoroethylenepropylene resin, and ethylene-terrafluoroethylene copolymer resin.

4. The process for producing a granular photocatalytic material according to claim 1, wherein the filler contains an inorganic porous material in an amount of less than 20% by weight of the photocatalyst mixture.

5. The process for producing a granular photocatalytic material according to claim 1, wherein a textured pattern is formed on the surface of the granular photocatalytic material.

6. The process for producing a granular photocatalytic material according to claim 1, wherein a slurry containing one or more materials selected from sodium carbonate, calcium hydroxide, calcium oxide, sodium hydrogen carbonate, and silicon dioxide is applied on the surface of the granular photocatalytic material.

* * * * *